US007877700B2

(12) United States Patent
Carr et al.

(10) Patent No.: US 7,877,700 B2
(45) Date of Patent: Jan. 25, 2011

(54) ADDING ACCESSIBILITY TO DRAG-AND-DROP WEB CONTENT

(75) Inventors: Derek W. Carr, Apex, NC (US);
Bradley H. Hayes, Colts Neck, NJ (US);
Jeremy G. Perry, Raleigh, NC (US);
Michael Wanderski, Durham, NC (US);
Ajamu Wesley, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 11/943,398

(22) Filed: Nov. 20, 2007

(65) Prior Publication Data
US 2009/0132944 A1 May 21, 2009

(51) Int. Cl.
*G06F 3/048* (2006.01)
(52) U.S. Cl. ..................................... 715/769
(58) Field of Classification Search ............. 715/769
See application file for complete search history.

(56) References Cited

U.S. PATENT DOCUMENTS

| | | | |
|---|---|---|---|
| 5,186,629 A | 2/1993 | Rohen | |
| 5,953,008 A | 9/1999 | Hagiuda | |
| 6,380,956 B1 | 4/2002 | Yee et al. | |
| 6,591,295 B1 | 7/2003 | Diamond et al. | |
| 6,686,938 B1 | 2/2004 | Jobs et al. | |
| 7,231,609 B2* | 6/2007 | Baudisch | 715/769 |
| 2006/0156314 A1 | 7/2006 | Waldorf | |
| 2008/0077874 A1* | 3/2008 | Garbow et al. | 715/764 |
| 2010/0070900 A1* | 3/2010 | Cummins et al. | 715/769 |

OTHER PUBLICATIONS

Winberg, Fredrik et al., "Designing Accessible Auditory Drag and Drop", In Proceedings of the 2003 Conference on Universal Usability (Vancouver, British Columbia, Canada, Nov. 10-11, 2003)., CUU '03. ACM, New York, NY, 152-153. DOI= http://doi.acm.org/10.1145/957205.957235,(Nov. 2003),152-153.

\* cited by examiner

*Primary Examiner*—Ba Huynh
(74) *Attorney, Agent, or Firm*—DeLizio Gilliam, PLLC

(57) ABSTRACT

Techniques for enhancing accessibility to web content are described herein. In some embodiments, a method includes presenting an activation element in association with a web page and detecting activation of the activation element, wherein the detection occurs following an activation event. The method can also include identifying draggable elements and drop zones in the web page and associating identifiers with the draggable elements and the drop zones, wherein the identifiers indicate one or more input events that will move a certain one of the draggable elements to a certain one of the drop zones. The method can also include modifying the web page to display the identifiers in association with the draggable elements and the drop zones, detecting the input events, and moving the certain one of the draggable elements to the certain one of the drop zones.

17 Claims, 5 Drawing Sheets

ADDING ACCESSIBILITY TO DRAG-AND-DROP WEB CONTENT

FIELD OF INVENTION

Embodiments of the invention generally relate to the field of drag-and-drop functionality, and more particularly to enhancing drag-and-drop functionality for web content.

BACKGROUND

Drag-and-drop user interfaces are commonly employed to perform visual layout customization with screen objects and to create different associations between abstract objects. The drag-and-drop action typically involves selecting a virtual object by pressing a mouse button or pointing device button, "dragging" the object to a desired location or onto another object while holding the button, and "dropping" the object by releasing the button. Some disabled users (e.g. blind users, users lacking motor control, etc.) may have difficulties utilizing drag-and-drop environments, as they may have trouble using mice and other pointing devices. However, many of these users can effectively use keyboards.

SUMMARY

In some embodiments, a method includes presenting an activation element in association with a web page and detecting activation of the activation element, wherein the detection occurs following an activation event. The method can also include identifying draggable elements and drop zones in the web page and associating identifiers with the draggable elements and the drop zones, wherein the identifiers indicate one or more input events that will move a certain one of the draggable elements to a certain one of the drop zones. The method can also include modifying the web page to display the identifiers in association with the draggable elements and the drop zones, detecting the input events, and moving the certain one of the draggable elements to the certain one of the drop zones.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENTS

An increasing number of web portals and pages are moving toward making their sites more "user friendly". Although operating systems often support drag-and-drop functionality, web page environments rarely provide it for common internet users. Some embodiments of the invention allow users to use drag-and-drop functionality within a web page environment. Additionally, some embodiments provide increased accessibility and usability to people who are unable, for various reasons, to utilize drag-and-drop environments with mice or other pointing devices. Some embodiments accomplish this by modifying web pages to move draggable elements to drop zones via hot keys (i.e., keyboard keys), voice commands, or other suitable user input techniques.

The description that follows includes exemplary systems, methods, techniques, instruction sequences and computer program products that embody techniques of the invention. However, the described invention may be practiced without these specific details. For instance, well-known web-related components, protocols, structures and techniques have not been shown to avoid obfuscating the description.

Figure 1:
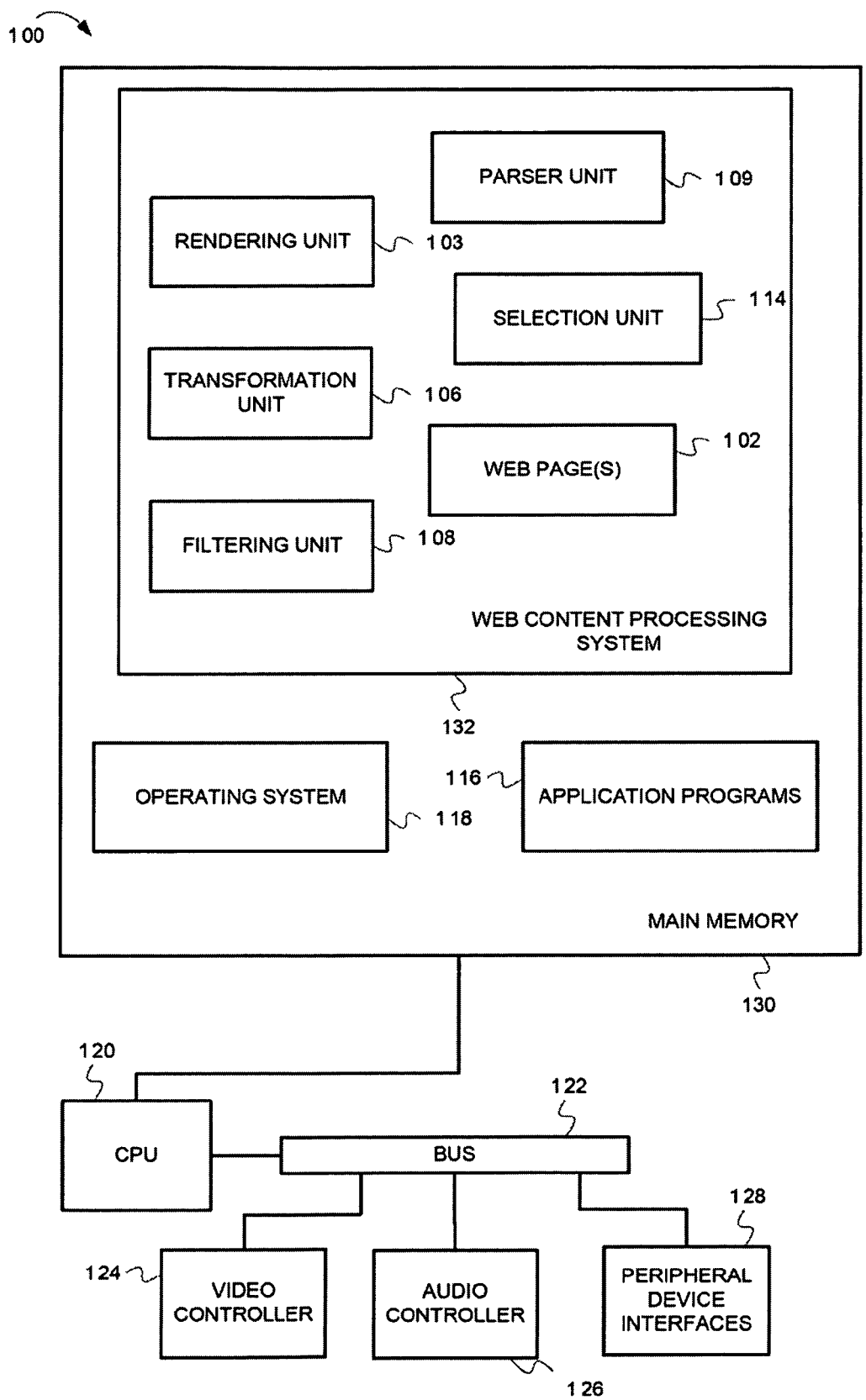
FIG. 1 illustrates a web content processing system that enhances drag-and-drop functionality for web content, according to some embodiments of the invention.

FIG. 1 illustrates a computer system including a web content processing system that can enhance drag-and-drop functionality for web content, according to some embodiments of the invention. The computer system 100 includes a main memory 130 connected to a central processing unit ("CPU") 120. The CPU 120 is connected to a bus 122, which is connected to a video controller 124, audio controller 126, and peripheral device interfaces 128. The video controllers 124 can present video content on a display device (e.g., a liquid crystal display monitor), while the audio controller can present audio content on audio devices (e.g., speakers). The peripheral device interfaces 128 can process input/output ("I/O") from various I/O devices, such as a mouse, keyboard, microphone, printer, scanners, etc.

The main memory 130 includes an operating system 118, application programs 116, and a web content processing system 132. The web content processing system 130 includes a web page 102, rendering unit 103, transformation unit 106, filtering unit 108, parser unit 109, selection unit 114, and activation unit 110.

The rendering unit 103 can render the web page 102, which can include content from web portals, such as Yahoo!, Google, etc. In some embodiments, the selection unit 114 detects when a user has provided input to launch a process for enhancing drag-and-drop functionality in the web page 102, input indicating a hot key press or voice command, etc.

The parser unit 109 can search through code of the web page 102 for characters and symbols that signify draggable elements and drop zones. The transformation unit 106 can match hot keys and voice commands with the draggable elements and drop zones identified by parser unit 109. In some embodiments, the transformation unit 106 can add and/or modify the web page's code, so users can activate the draggable elements and drop zones using the hot keys and voice commands.

The filtering unit 108 can reduce the number of draggable elements, drop zones, and hot key options/voice command options in the web page 102. This reduction can make the drag-and-drop interface more understandable for some uses (e.g., users who perceive the web page's drag-and-drop options though a voice reader in the rendering unit 103). After the reduction, the rendering unit 103 can present identifiers that indicate hot keys or voice commands uses for selecting draggable elements and drop zones within the web page 102. The selection unit 114 detects hot key presses and voice commands that select draggable elements and drop zones.

Although not shown in FIG. 1, the web content processing system 132 can include other components for acquiring, rendering, and storing web content. Those components can include any suitable code (e.g., Javascript) for processing web content. In some embodiments, one or more of the components the web processing system 132 can be included in a web browser. Furthermore, any of the components described herein can include hardware, firmware, and/or machine-readable media including instructions for performing the operations described herein. Machine-readable media includes any mechanism that provides (i.e., stores and/or transmits) information in a form readable by a machine (e.g., a game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

SYSTEMS OPERATIONS

This section describes operations performed by some embodiments of the systems described above. In certain embodiments, the operations can be performed by executing instructions residing on machine-readable media (e.g., software), while in other embodiments, the operations can be performed by a combination of software, hardware, and/or other logic (e.g., firmware). In some embodiments, the operations can be performed in series, while in other embodiments, one or more of the operations can be performed in parallel. Moreover, some embodiments can perform less than all the operations shown in the Figures.

Figure 2:
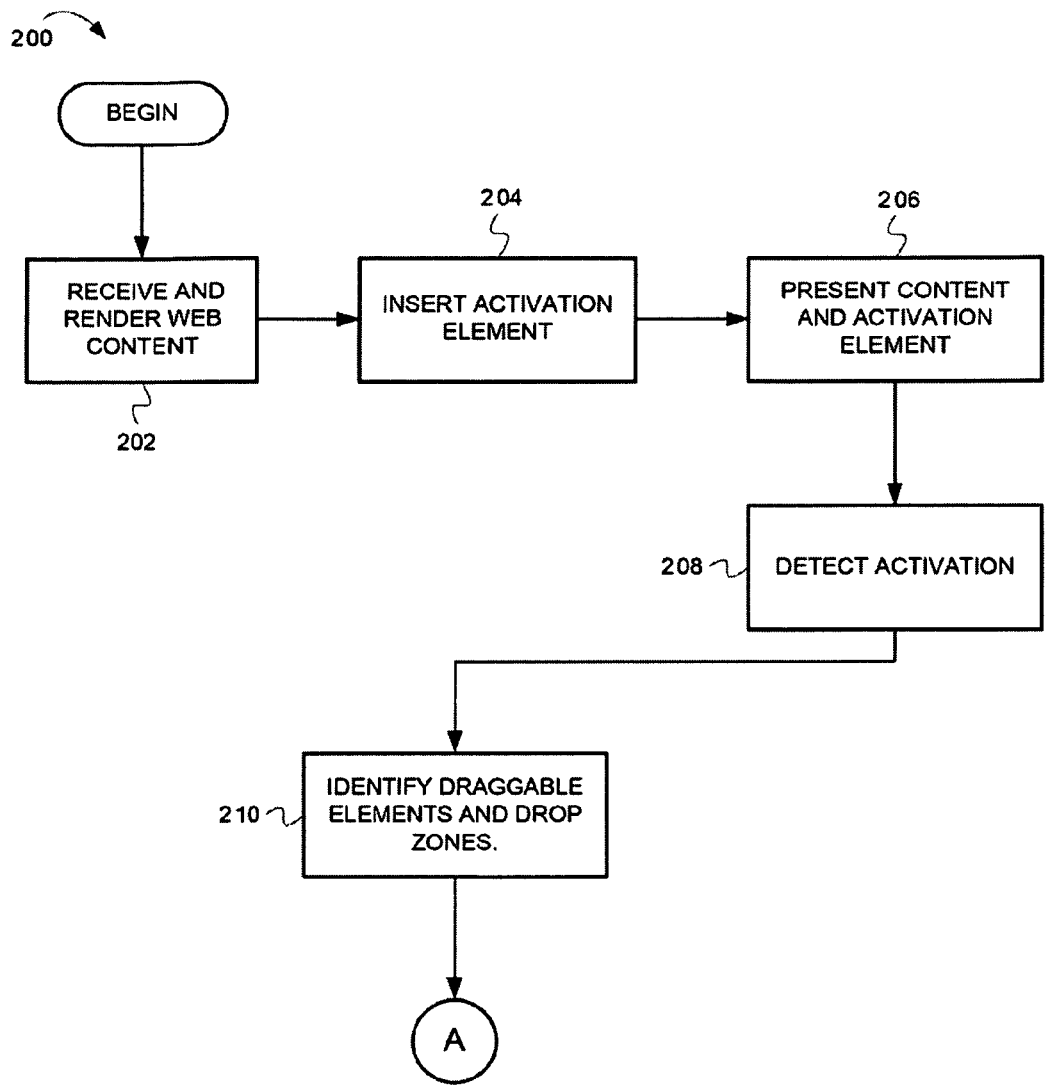
FIG. 2 is a flow diagram illustrating operations for augmenting drag-and-drop-capable web pages to work with other hot keys and other input types, according to some embodiments of the invention.

FIG. 2 is a flow diagram illustrating operations for augmenting drag-and-drop-capable web pages to work with other hot keys and other input techniques, according to some embodiments of the invention. The flow 200 will be described with reference to the computer system in FIG. 1. In FIG. 2, flow 200 begins at block 202.

Figure 4:
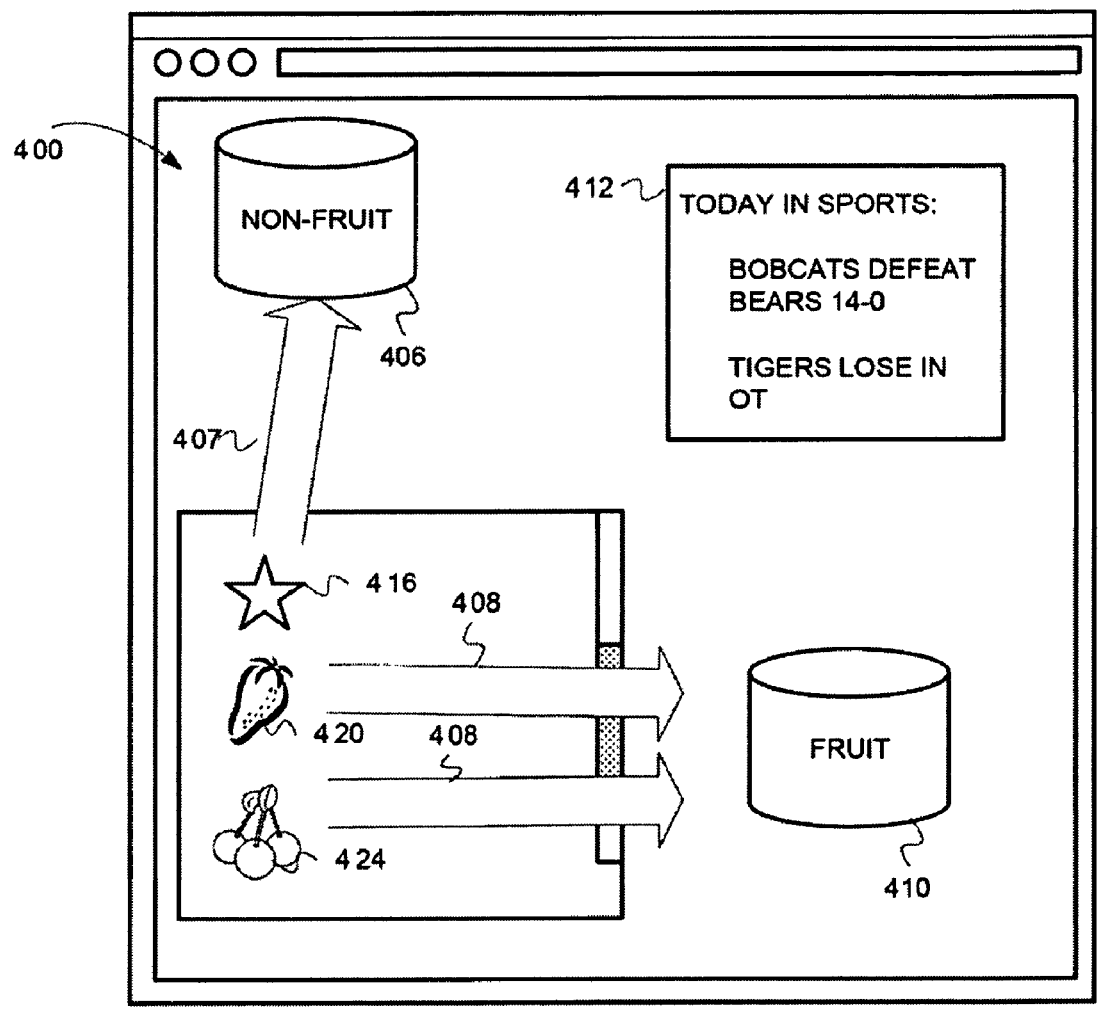
FIG. 4 is a diagram illustrating a web page including graphical objects that are drag-and-drop capable.

At block 202, the rendering unit 103 receives and renders web content. For example, the rendering unit 103 receives a web page 102 and presents it on a display device connected to the video controller 124. The web page 102 can include code, such as the Hyper Text Markup Language (HTML) code or the Extensible Hyper Text Markup Language (XHTML) code. The code can identify graphical objects, text, photos, animations, audio, etc. for presentation by the rendering unit 103. Some of the graphical objects are drag-and-drop capable, so users can drag and drop those objects using a mouse or other pointing device. FIG. 4 helps illustrate this concept. FIG. 4 is a diagram illustrating a web page including graphical objects that are drag-and-drop capable. In FIG. 4, a web page 400 includes text 412, draggable graphical objects 416, 420, & 424, and drop zones 406 & 410. The rendering unit 103 can render such a web page by performing the operations of block 202 of FIG. 2. In FIG. 4, a user can use a mouse to drag and drop the graphical object 416 in the drop zone 406 (see arrow 407). Similarly, a user can use a mouse to drag and drop the graphical objects 420 & 424 in the drop zone 410 (see arrows 408).

Referring back to FIG. 2, the flow continues at block 204.

At block 204, the activation unit 110 inserts an activation element into the content. In some embodiments, the activation unit 110 adds code (e.g., HTML code) representing the activation element to the code representing the web page 102. In other embodiments, the activation element is not part of the web page itself, but is part of the user interface containing the web page. The activation element can be a button, a window for receiving voice commands, or any other suitable variation of input components. The flow continues at block 206.

Figure 5:
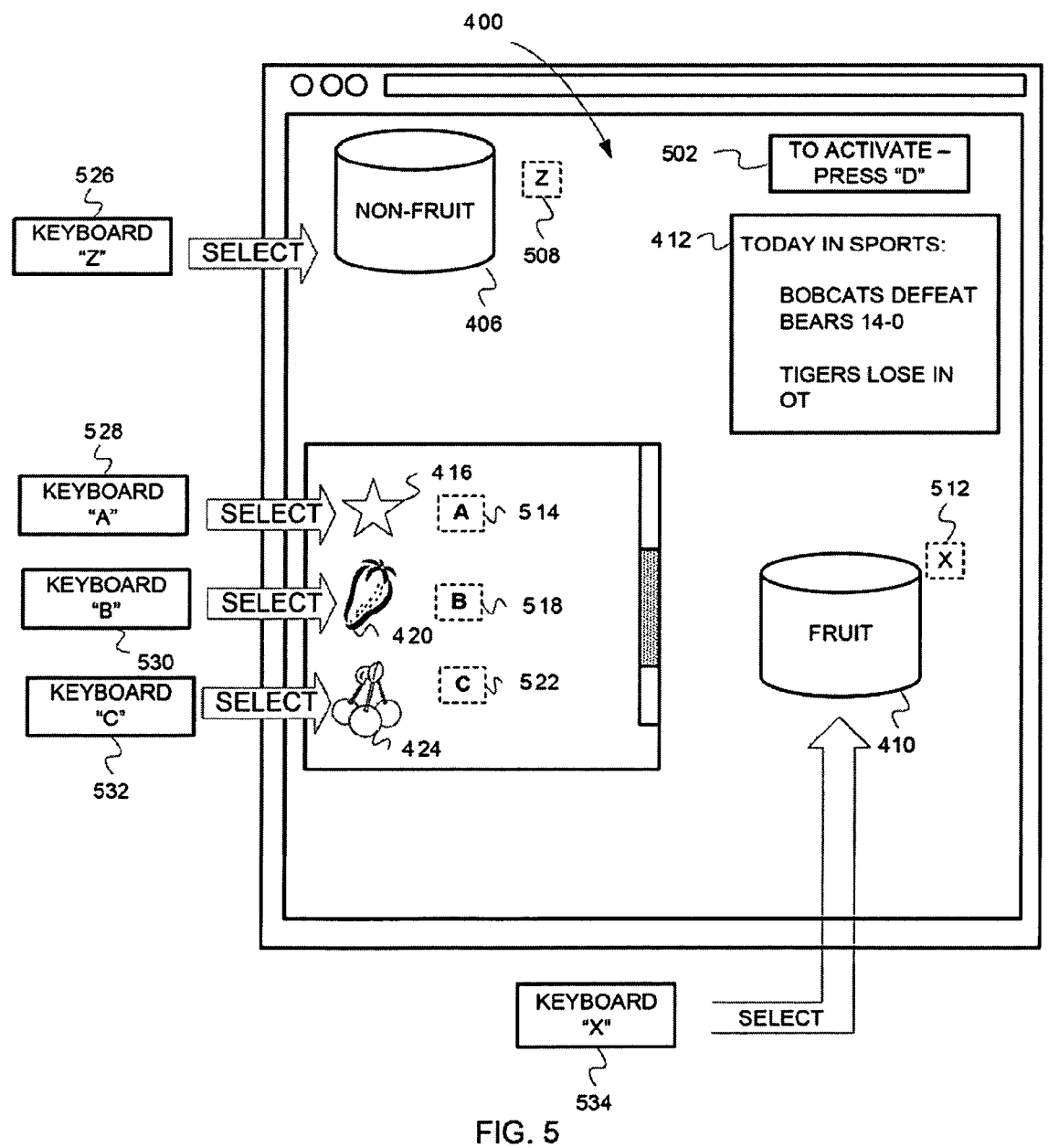
FIG. 5 is a diagram illustrating a web page including drag-and-drop objects that respond to hot keys and other input.

At block 206, the activation unit 110 presents the activation element. FIG. 5 helps illustrate this concept. FIG. 5 is a diagram illustrating a web page including drag-and-drop objects that respond to hot keys and other input. FIG. 5 shows the web page 400. In FIG. 5, the activation unit 110 has added an activation button 502 to the web page 400. A user can activate the activation button 502 by pressing a keyboard key, such as keyboard key "D", as shown. Alternatively, the activation element can include a voice reader that responds to a user's voice commands. Upon activation, the web content processing system 132 performs a process that adds hot key and other features to a web page's drag-and-drop objects. The flow continues at block 208.

At block 208, the selection unit 114 detects activation of the activation element. For example, the selection unit 114 can detect an activation event, such as a hot key press or voice command associated with the activation element. The flow continues at block 210.

At block 210, the parser unit 109 identifies draggable elements and drop zones in the web page 102. In some embodiments, the parser unit 109 parses through the web page's code in search of certain characters or symbols that identify draggable elements and drop zones. The parser unit 109 can compile a list of all draggable elements and drop zones. The flow continues at FIG. 3.

Figure 3:
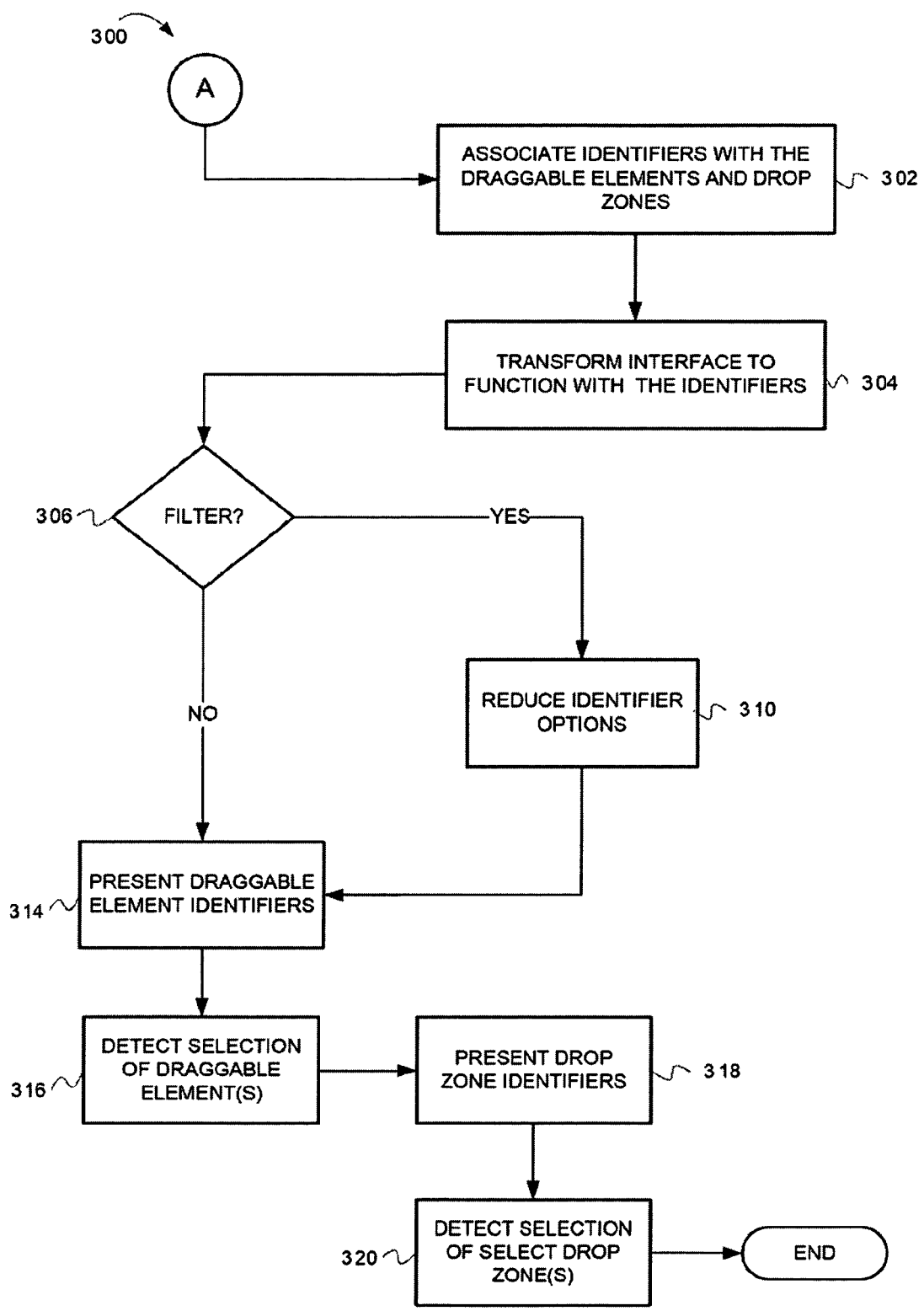
FIG. 3 is a flow diagram (continuing from FIG. 2) illustrating more operations for augmenting a web page's draggable elements and drop zones to work with hot keys and other input, according to some embodiments of the invention.

FIG. 3 is a flow diagram (continuing from FIG. 2) illustrating more operations for augmenting a web page's draggable elements and drop zones to work with hot keys and other input, according to some embodiments of the invention. The flow will be described with reference to the computer system of FIG. 1. In FIG. 3, the flow continues at block 302.

At block 302, the transformation unit 106 associates hot keys and/or voice commands with draggable elements and drop zones. The hot keys and/or voice commands identifiers are also associated with identifiers (see 514, 518, 522, etc.) that identify the hot keys and/or voice commands that can select the draggable graphical objects. For example, in FIG. 5, the transformation unit 106 can associate a hot key "A" with the draggable graphical object 416, hot key "B" with the draggable graphical object 420, etc. The flow continues at block 304.

At block 304, the transformation unit 106 transforms the web page 102 to function with the hot keys and/or voice commands. In some embodiments, the transformation unit 106 inserts, into the web page 102, code (e.g., HTML code) that displays identifiers (e.g., see 514, 518, 522, etc.) indicating a relationship between the hot keys and the draggable objects and drop zones. In addition, the transformation unit 106 can update the web page 102 to include code that audibly communicates relationships between voice commands and the draggable elements and drop zones. This changes the web page to a state in which users can use hotkeys and voice commands to illicit drag-and-drop functionality. For example, blind users or users without fine motor control can utilize the drag and drop functionality without using a mouse. The flow continues at block 306.

At block 306, the filtering unit 108 determines whether it will filter the identifiers and draggable elements. By filtering the draggable elements and identifiers, the filtering unit 108 can reduce the number of draggable element options to a more manageable number. Filtering can result in a modified arrangement of the objects in the drag-and-drop interface. Filtering may be particularly useful in embodiments in which the rendering unit 103 audibly presents draggable elements and their identifiers. Listening to long lists of draggable elements and identifiers may be tedious for some users. In some embodiments, filtering is automatically turned on, but may be turned off via user input. If filtering is not performed, the flow continues at block 314. If filtering is performed, the flow continues at block 310.

At block 310, the filtering unit 108 groups identifier options to reduce the number of available identifier options. In some embodiments, the filtering unit 108 reduces the number of identifier options by showing only the most frequently used draggable elements and drop zones in the active section of the web page 102. As a result, the filtering unit 108 reduces the number of hot key choices a user has in an interface, and it reduces the number of elements the rendering unit 103 audibly presents. The flow continues at block 312.

At block 314, the rendering unit 103 presents, in the web page 102, the identifiers associated with the hot keys and/or voice commands. The rendering unit 103 can present each identifier near a draggable element, as shown in FIG. 5 (see 514, 518, & 522). The rendering unit 103 can also audibly. The flow continues at block 316.

At block 316, the selection unit 114 detects selection of a draggable element and/or drop zone within web page 102. Users can select the draggable elements by activating the associated hot key or speaking a voice command. For example, as shown in FIG. 5, the draggable graphical object 420 is juxtaposed to the "B" identifier 516. A user can select the draggable graphical object 410 by pressing keyboard key "B" or by speaking the letter "B" into a microphone connected to the computer system 100. The flow continues at block 318.

At block 318, after selection of a draggable element, the rendering unit 103 presents identifiers associated with the drop zones. In FIG. 5, this operation would cause the rendering unit 103 to present the identifiers 508 & 512. In some embodiments, the rendering unit 103 audibly presents the identifiers 508 & 512. The flow continues at block 320.

At block 320, the selection unit 114 detects selection of a drop zone within the web page 102. For example, in FIG. 5, a user selects the drop zone 406 by pressing keyboard key "Z" or by speaking the letter "Z" into a microphone connected to the computer system 100. Once a drop zone is selected, the system 100 moves the draggable graphical object 416 into the drop zone as if the user dragged-and-dropped the graphical object with a mouse. In some embodiments, the drag-and-drop operation causes addition operations specific to the web page (e.g., a file is deleted, money transferred between accounts, etc.). From block 320, the flow ends.

Although FIG. 3 shows selecting draggable elements and drop zones as two separate operations, some embodiments enable users to select draggable elements and drop zones in a single operation. For example, a user may be working in an email box. If a draggable email message can be dropped in only one drop zone, the filtering unit 108 can associate both the email message and drop zone with a hot key. The user need only press one hot key to drop the email message in the drop zone.

OTHER EMBODIMENTS

While the invention(s) is (are) described with reference to various implementations and exploitations, it will be understood that these embodiments are illustrative and that the scope of the invention(s) is not limited to them. In general, the techniques described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A computer-implemented method for processing, in a computer system, web page information, the method comprising:
    presenting, on a display device of the computer system, an activation element in association with a web page;
    detecting activation of the activation element, wherein the detection occurs following an activation event;
    identifying draggable elements and drop zones in the web page;
    associating identifiers with the draggable elements and the drop zones, wherein the identifiers indicate one or more input events that will move the draggable elements to the drop zones;
    modifying the web page to display the identifiers in association with the draggable elements and the drop zones;
    detecting the one or more input events; and
    moving a certain one of the draggable elements to a certain one of the drop zones.

2. The method of claim 1, further comprising:
    determining an active section in the web page, wherein the active section includes some of the draggable elements and some of the drop zones; and
    eliminating, after determining the active section, one or more of the identifiers, the draggable elements, and the drop zones.

3. The method of claim 1, wherein the input events include one or more selected from keyboard key presses and voice commands.

4. The method of claim 1, wherein the activation event includes one or more of a mouse click, a keyboard key press, a press of a combination of keyboard keys, and a voice command.

5. The method of claim 1, wherein the identifying draggable elements and drop zones includes searching for specific characters in a code that represents the web page, wherein the characters indicate the draggable elements and the drop zones.

6. A computer system comprising:
    a processor;
    a video display controller connected to the processor;
    a memory, the memory including,
        an activation unit configured to insert an activation element into a web page and to detect activation of the activation element, wherein the detection occurs following an activation event;
        a parser unit configured to identify draggable elements and drop zones in a web page;
        a transformation unit configured to associate identifiers with the draggable elements and the drop zones, wherein the identifiers indicate input events that will move a certain one of the draggable elements to a certain one of the drop zones;

a rendering unit configured to visually communicate via the video display controller the identifiers associated with the draggable elements and the drop zones in the web page; and a selection unit configured to detect the input events, wherein the input events include keyboard key presses or voice commands.

7. The apparatus of claim 6, wherein the rendering unit's communication of the identifiers includes one or more of a graphical representation of the identifiers and an audible representation of the identifiers.

8. The apparatus of claim 6, further comprising a filtering unit configured to eliminate one or more of the identifiers, the draggable elements, and the drop zones.

9. The apparatus of claim 6, wherein the parser unit is further configured to search for specific characters in a code that represents the web page, wherein the characters indicate the draggable elements and the drop zones.

10. The apparatus of claim 6, wherein the transformation unit is further configured to modify the web page to display the identifiers in association with the draggable elements and the drop zones.

11. The apparatus of claim 6, wherein the detection unit is further configured to move the certain one of the draggable elements to the certain one of the drop zones.

12. A machine-readable storage medium including instructions that when executed by a machine cause the machine to perform operations comprising:

presenting an activation element in association with a web page;

detecting activation of the activation element, wherein the detection occurs following an activation event;

identifying draggable elements and drop zones in the web page;

associating identifiers with the draggable elements and the drop zones, wherein each of the identifiers indicates input events that will move a certain one of the draggable elements to a certain one of the drop zones;

modifying the web page to display the identifiers in association with the draggable elements and the drop zones;

detecting the input events; and moving the certain one of the draggable elements to the certain one of the drop zones.

13. The machine-readable storage medium of claim 12, the instructions further comprising:

determining an active section in the web page, wherein the active section includes some of the draggable elements and some of the drop zones; and eliminating, after determining the active section, one or more of the identifiers, the draggable elements, and the drop zones.

14. The machine-readable storage medium of claim 12, wherein the input events include one or more keyboard key presses or one or more voice commands.

15. The machine-readable storage medium of claim 12, wherein each drop zone is a target for the draggable element.

16. The machine-readable storage medium of claim 12, wherein the activation event includes one or more of a mouse click, a keyboard key press, a press of a combination of keyboard keys, and a voice command.

17. The machine-readable storage medium of claim 12, wherein the identifying draggable elements and drop zones includes searching for specific characters in a code that represents the web page, wherein the characters indicate the draggable elements and the drop zones.

* * * * *